United States Patent
Kim et al.

(10) Patent No.: US 6,678,451 B2
(45) Date of Patent: Jan. 13, 2004

(54) MULTIMODE OPTICAL FIBER HAVING A STRUCTURE TO REDUCE SCATTERING LOSS

(75) Inventors: Chang-Bum Kim, Kumi-shi (KR); Jin-Sung Yang, Kumi-shi (KR); Mun-Hyun Do, Kumi-shi (KR); Yoon-Gun Jang, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 313 days.

(21) Appl. No.: 09/814,675

(22) Filed: Mar. 22, 2001

(65) Prior Publication Data

US 2001/0031121 A1 Oct. 18, 2001

(30) Foreign Application Priority Data

Mar. 22, 2000 (KR) ........................................ 2000-14517

(51) Int. Cl.[7] ................................................. G02B 6/02
(52) U.S. Cl. ....................................................... 385/124
(58) Field of Search .............................. 427/163.2, 402, 427/237, 255.18, 255.37; 65/420; 385/123, 124, 127, 126, 128; 359/341, 345

(56) References Cited

U.S. PATENT DOCUMENTS 5,993,899 A * 11/1999 Robin et al. ............. 427/163.2

* cited by examiner

*Primary Examiner*—Frank G. Font
*Assistant Examiner*—Michael D P. Mooney
(74) *Attorney, Agent, or Firm*—Cha & Reiter

(57) ABSTRACT

Disclosed is a multimode optical fiber having a structure to reduce scattering loss which includes a core divided into a central region having the optimal refractive index according to an optimal core shape index minimizing the scattering loss of the multimode optical fiber, and a peripheral region having the refractive index lower than that of the central region; and a cladding enclosing the core and having the refractive index lower than the lowest refractive index of the core.

4 Claims, 2 Drawing Sheets

FIG. 1 [PRIOR ART]

MULTIMODE OPTICAL FIBER HAVING A STRUCTURE TO REDUCE SCATTERING LOSS

CLAIM OF PRIORITY

This application claims priority to an application entitled, "Multimode Optical Fiber Having a Structure to Reduce Scattering Loss", filed with the Korean Industrial Property Office on Mar. 22, 2000 and there duly assigned Serial No. 2000-14517.

BACKGROUND OF THE INVENTION

1. Field of the Invention

The present invention generally relates to an optical fiber, and more particularly to a multimode optical fiber having a structure to reduce scattering loss.

2. Description of the Related Art

In general, an optical fiber is classified into a step index fiber and a graded index fiber. The step index optical fiber is generally comprised of a core with the refractive index $n_1$ and a cladding with the refractive index $n_2$. In step index fiber, the refractive indices of the core and the cladding respectively maintain a constant value. However, the refractive index profile of the core changes gradually with distance from the fiber axis in the graded index optical fiber. The varying characteristics of the refractive indices n(r) from the fiber axis along the radial direction are described according to the following equation 1:

$$n(r) = n_1 \sqrt{1 - 2(r/a)^\alpha \Delta} \quad r \leq a,$$
$$n(r) = n_2 \sqrt{1 - 2\Delta} \quad r > a \quad (1)$$

Herein, $n_1$ represents the refractive index of the center of the core, $n_2$ represents the refractive index of the cladding, a represents the radius of the core, $\alpha$ represents the core shape index, and $\Delta$ represents the parameter determining the degree of the refractive index variation.

Here, only in the case of $n_1 \approx n_2$, the aforementioned $\Delta$ is approximated according to the following equation 2:

$$\Delta = \frac{(n_1 - n_2)}{n_1}, \quad (2)$$

where $\Delta$ is defined as a relative index difference.

FIG. 1 is a sectional view illustrating the refractive index profile of the graded index fiber according to the prior art. FIG. 1 illustrates the graded index fiber 10, including the core 11 and the cladding 12, and the ideal refractive index profile 13 as well as the real refractive index profile 14 of the graded index fiber 10. In ideal refractive index profile 13, the region of the core 11 can be defined by the equation 1. In actual practice, however, the center of the core 11 with a recess represented by the refractive profile 14, as shown in FIG. 1, is realized. Here, the recessed shape is caused during the fabrication of an optical fiber preform.

Typically, a chemical vapor deposition method is used in fabricating an optical fiber preform. In this method, after the cladding of the optical fiber preform is prepared, the core is formed by injecting and sintering gasses into the cladding. Here, the core is not filled up to the center, thus a hole having a specified diameter is formed within the glass tube. Thereafter, the optical fiber preform is completed finally through a collapsing. As a consequence of this collapsing process, an optical fiber drawn from the optical fiber preform exhibits a real refractive index profile 14 as shown in FIG. 1.

Normally, the refractive index variation degree of the graded index fiber 10 can be adjusted by the type and the amount of dopant added to the fiber. Common dopant material used include titanium, germanium, boron, and etc. However, the dopant over the graded index fiber 10 causes scattering loss of the optical signal within the graded index optical fiber 10. Hence, as the composition rate of the dopant is increased, the scattering loss of the optical signal also increases.

SUMMARY OF THE INVENTION

It is, therefore, an object of the present invention is to provide an improved multimode optical fiber for eliminating the scattering properties.

In the preferred embodiment, a multimode optical fiber having a structure to reduce scattering loss includes a core divided into a central region with an optimal refractive index and a peripheral region whose refractive index is lower than the central region of the core, and a cladding enclosing the core, wherein the cladding having an refractive index value lower than the lowest refractive index value of the core. Preferably, the refractive index of the central region and the peripheral region range between 0.5 and 2.5.

BRIEF DESCRIPTION OF THE DRAWINGS

The above and other objects, features, and advantages of the present invention will become more apparent from the following detailed description when taken in conjunction with the accompanying drawing in which.

DETAILED DESCRIPTION OF THE PREFERRED EMBODIMENT

A preferred embodiment of the present invention will be described herein below with reference to the accompanying drawings. For the purpose of simplicity and clarity, well-known functions or constructions are not described in detail as they would obscure the invention in unnecessary detail.

Figure 2:
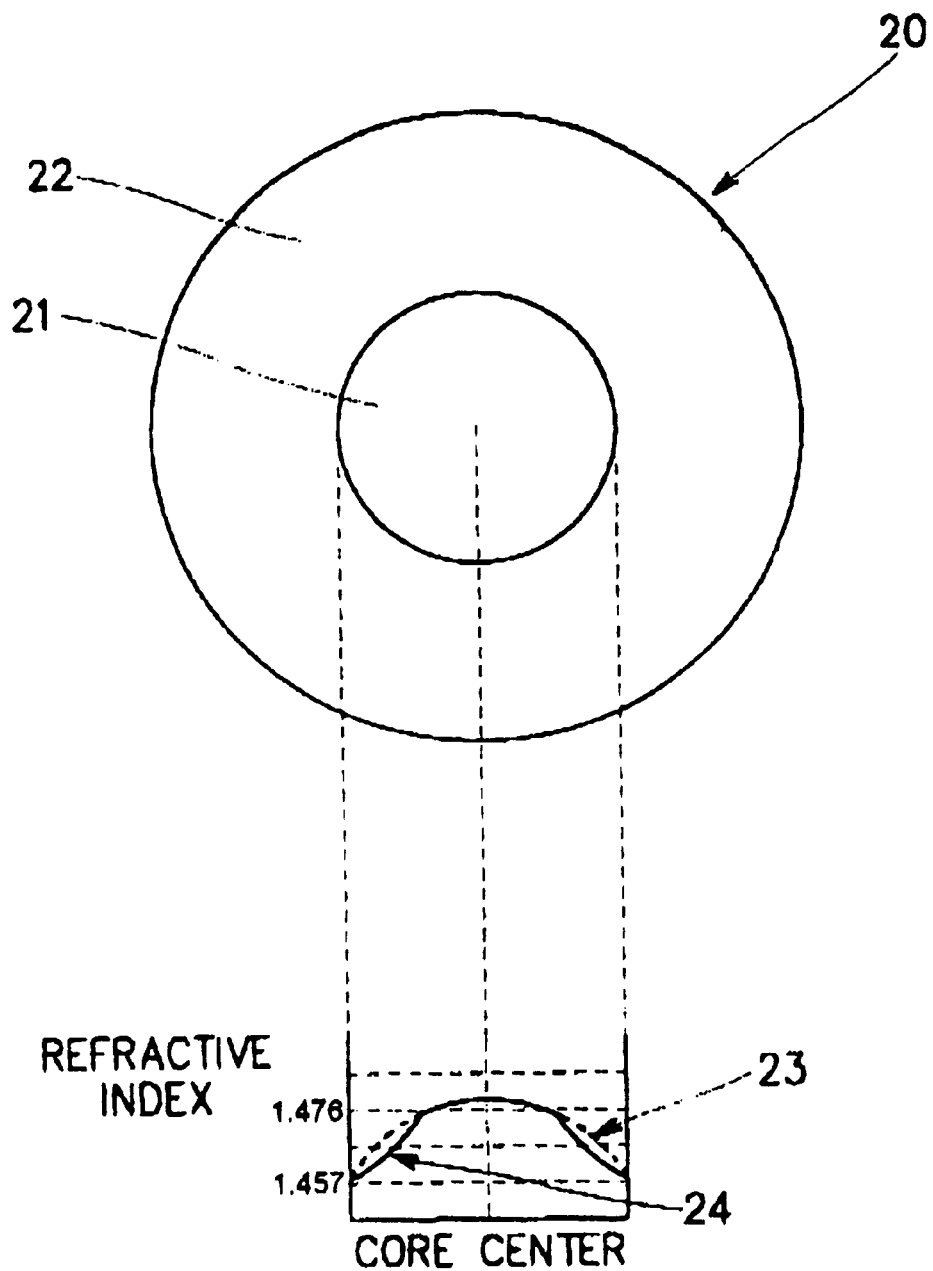

FIG. 2 illustrates the refractive index profile of a multimode fiber 20 according to the present invention in which the scattering loss is minimized. In particular, the multimode fiber 20 according to the present invention is configured so that the reflective index profile of the core layer includes the reflective index 23 at the center portion of a core 21 and the refractive index profile 24 at the peripheral region of the core 21.

A core index profile can be expressed according to the following equation 3:

$$\alpha_{opt} = 2 - 2p - \frac{12}{5}\Delta, \quad (3)$$

$$P = \frac{n_1}{N_1} \cdot \frac{\lambda}{\Delta} \cdot \frac{d\Delta}{d\lambda},$$

$$N_1 = n_1 - \lambda \frac{dn_1}{d\lambda}$$

Furthermore, the optimal refractive index profile according to the optimal core shape index is defined according the following equation 4:

$$n(r) = n_1 \sqrt{1 - 2(r/\alpha)^{\alpha_{opt}} \Delta} \quad (4)$$

A preferred embodiment for setting the refractive index profile as shown in FIG. 2 comprises following three steps.

Figure 1:
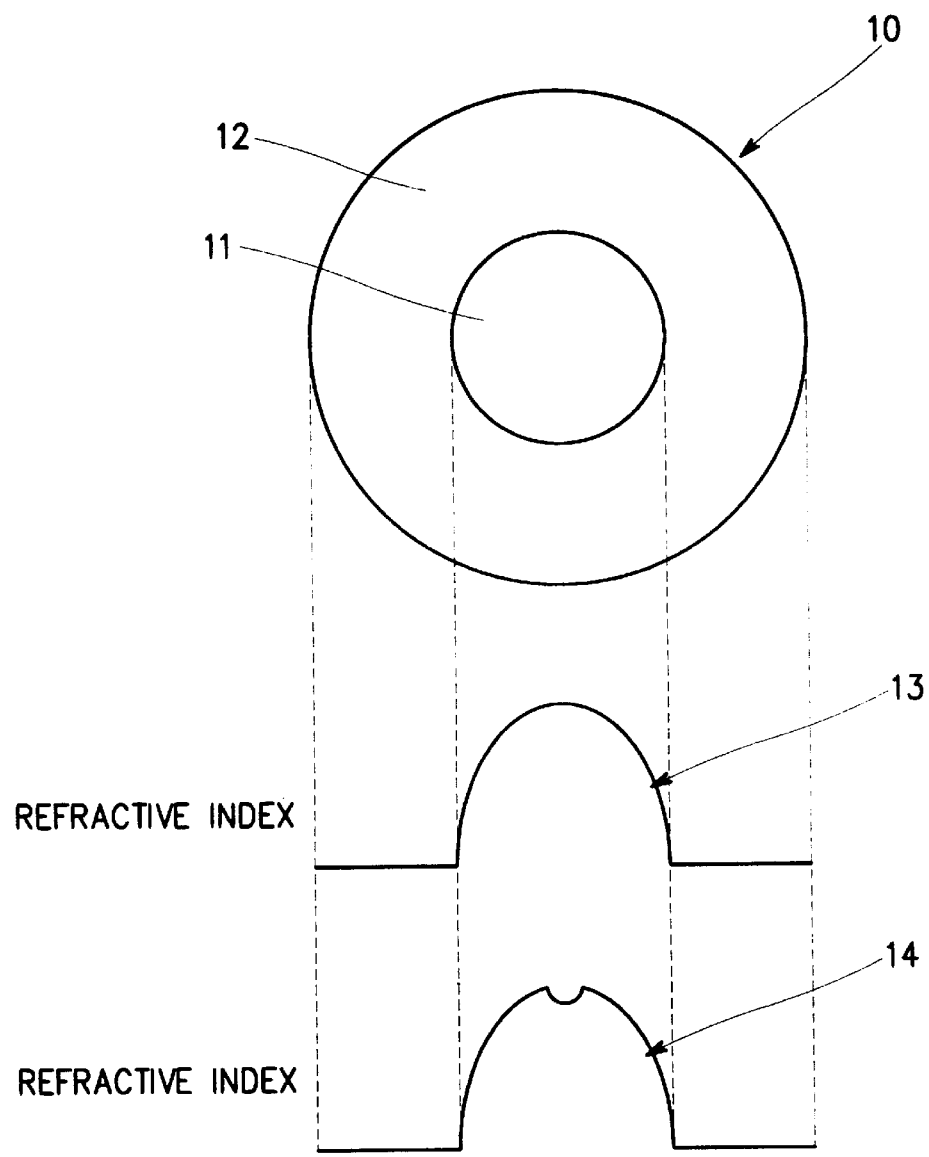
FIG. 1 is a sectional view illustrating the refractive index profile of a graded index fiber of the prior art; and, FIG. 2 is the refractive index profile of a multimode optical fiber having a structure to reduce the scattering loss according to a preferred embodiment of the present invention.

The first step involves providing a core layer, then setting up the refractive index of the center of the core 21. The refractive index of the center portion of the core 21 is originally set to exhibit an ideal profile 13 as shown in FIG. 1. It should noted, however, that such an ideal refractive profile can not be realized due to flaws (namely, a slight defect or hole formed within the glass tube) in the chemical vapor deposition process.

The second step involves calculating the relative refractive index variation of the multimode optical fiber 20. If the refractive index difference between the core 21 and the cladding 22 is relatively small, the relative index difference is defined according to the foregoing equation 2. However, if the differences are relatively large, the following equation 5 is used.

$$\Delta = \frac{(n_1^2 - n_2^2)}{2n_1^2} \quad (5)$$

The third step involves calculating an optimal core shape index. The optimal core shape index is defined according to the foregoing equation 3. The optimal core shape index is established to minimize the scattering loss in the multimode optical fiber 20. The refractive index profile 24 of the peripheral region of the core 21 is set to exhibit the profile characteristics as shown in FIG. 2. The refractive index profile 23 of the center of the core 21 has the optimal refractive index profile defined by the foregoing equation 4. Here, the refractive index of the peripheral region of the core 21 is lower than the optimal refractive index. To achieve this, the composition rate of the dopant in the peripheral region of the core 21 is reduced. That is, the refractive index of the peripheral region of the core is lower than the optimal refractive index by reducing the amount of dopant doped in the peripheral region of the core 21.

Normally, if the core has an optimal refractive index profile, the scattering loss is reduced. According to the exemplary embodiment of the present invention, the dispersion loss associated with a multimode fiber is minimized by making the center of a core to exhibit an optimal refractive index profile, and the scattering loss is minimized by reducing the amount of dopant doped around the peripheral region of the core. By lowering the dopant amount, a lower refractive index that is lower than the optimal refractive index is achieved. According to a simulation carried out by the inventor using the refractive index profile of FIG. 2, it was found that a scattering loss for a solid profile 24 is reduced by 0.1–0.25 dB/km than that of a dotted profile 23.

As described above, the multimode fiber having a structure to reduce the scattering loss according to the present invention provides the advantages of improving the dispersion and the scattering properties, by identifying the refractive index in each position of the center of the core with the optimal refractive index profile, and making the refractive index in each position of the peripheral region of the core lower than the optimal refractive index profile.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A multimode optical fiber having a structure to reduce scattering loss, comprising:

a core divided into a central region having an optimal refractive index and a peripheral region whose refractive index is lower than said central region; and, a cladding enclosing said core, said cladding having an refractive index value lower than the lowest refractive index value of said core, wherein the optimal refractive index is defined by the following equation:

$$n(r) = n_1 \sqrt{1 - 2(r/\alpha)^{\alpha_{opt}} \Delta},$$

wherein, n(r) represents the refractive index in each position depending on the diametrical direction of said core, $n_1$ represents the refractive index of said central region of said core, $n_2$ represents the refractive index of said cladding, $\alpha$ represents the radius of the core, $\alpha_{opt}$ represents the optimal core shape index, and $\Delta$ represents the parameter determining degree of the refractive index variation.

2. The optical fiber according to claim 1, wherein the optimal core shape index is defined by following equation:

$$\alpha_{opt} = 2 - 2 \frac{1}{1 - \frac{\lambda}{n_1} \frac{dn_1}{d\lambda}} \cdot \frac{\lambda}{\Delta} \cdot \frac{d\Delta}{d\lambda} - \frac{12}{5} \Delta,$$

wherein $n_1$ represents the refractive index of said central region of said core, $n_2$ represents the refractive index of said cladding, and $\Delta$ represents the parameter determining degree of the refractive index variation.

3. The optical fiber according to claim 1, the parameter $\Delta$ determining the degree of the refractive index variation is defined by following equation:

$$\Delta = \frac{(n_1^2 - n_2^2)}{2n_1^2},$$

wherein $n_1$ represents the refractive index of said central region of said core, $n_2$ represents the refractive index of said cladding, and $\Delta$ represents the parameter determining degree of the refractive index variation.

4. The optical fiber according to claim 1, the parameter $\Delta$ determining the degree of the refractive index variation is further defined by following equation:

$$\Delta = \frac{(n_1 - n_2)}{n_1},$$

wherein $n_1$ represents the refractive index of said central region of said core, $n_2$ represents the refractive index of said cladding, and $\Delta$ represents the parameter determining degree of the refractive index variation.

* * * * *